Patented Jan. 6, 1953

2,624,665

UNITED STATES PATENT OFFICE 2,624,665

HERBICIDAL COMPOSITION

Arthur H. Schlesinger, Dayton, Ohio, assignor to Monsanto Chemical Company, St. Louis, Mo., a corporation of Delaware No Drawing. Application October 24, 1951, Serial No. 252,982

4 Claims. (Cl. 71—2.5)

The present invention provides new and highly valuable herbicidal compositions and methods of destroying or preventing plant growth in which such compositions are employed.

I have found that improved, very efficient herbicidal compositions are obtained when there are prepared oil-in-water emulsions of dibenzothiophene-5-monoxide. The emulsions may be obtained by first dissolving the oxide in an organic material which is a solvent therefor and then mixing the organic solution with water in the presence of an emulsifying agent. Because of the high toxicity of the oxide against living plants and the efficiency with which organic solutions of the same may be dispersed in an aqueous vehicle, extremely good herbicidal properties are evidenced by having only very small concentrations of the oxide, for example, concentrations of from 0.1 per cent to 2 per cent by weight of the total weight of the emulsion.

Emulsifying agents which may be employed are those customarily used in the art for the preparation of oil-in-water emulsions, e. g., ionic or non-ionic emulsifying or dispersing agents such as the long-chain alkylbenzenesulfonates, or polyglycol ethers. The emulsifying agents are likewise employed in only very small concentrations, say, in a quantity of from 0.05% to 2.0% by weight of the total weight of the emulsion, and hence do not affect the chemical stability of the oxide.

The herbicidal efficiency of the present oil-in-water emulsions of dibenzothiophene-5-monoxide is surprising, for as will hereinafter be disclosed, similarly prepared emulsions of dibenzothiophene-5,5-dioxide possess substantially no herbicidal effect.

Dibenzothiophene-5-monoxide is a readily obtainable compound, being easily prepared by the treatment of dibenzothiophene with chlorine and hydrolysis of the resulting addition compound, substantially as described by Brown et al. in the Journal of the American Chemical Society, 70, 1748-9 (1948).

The present invention is further illustrated, but not limited by the following example.

Example

Spray testing of the present herbicidal composition was conducted as follows:

A cyclohexanone solution of dibenzothiophene-5-monoxide and an emulsifying agent were added to water, the quantity of solution employed being calculated to give emulsions containing 1.0 per cent and 0.3 per cent by weight, respectively, of the oxide based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three weeks old corn and bean plants were sprayed with the respective emulsions, two plants of each variety being employed. The spraying was continued until droplets formed on and/or fell from the foliage and stems of the sprayed plants, up to 15 ml. of the aqueous suspension being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made.

| Percent Concentration of Oxide | Effect On— | |
|---|---|---|
| | Bean | Corn |
| 0.3 | Moderate injury | Moderate injury. |
| 1.0 | Severe injury, leaves dried. | Plant dead, leaves dried. |

Similar testing of dibenzothiophene-5,5-dioxide showed substantially no herbicidal effect on either the beans or the corn.

While dibenzothiophene-5-monoxide is most advantageously used as a herbicide when incorporated into an oil-in-water emulsion, it may also be used in other plant destroying methods. Thus it may be mixed with solid carriers such as clay, talc, pumice and bentonite to give herbicidal compositions which may be applied in toxic quantities to undesired plant growth. The oxide may also be mixed with liquid or solid agricultural pesticides, e. g., insecticides and/or fungicides. While solutions of the oxide in organic solvents therefor may be employed as herbicidal compositions, I have found that the oil-in-water emulsions of the oxide possess an improved tendency to adhere to plant foliage, and that the emulsions require less of the monoxide to give comparable herbicidal efficiency than do the organic solutions or the dry mixtures.

What I claim is:

1. A herbicidal composition comprising an oil-in-water emulsion of dibenzothiophene-5-monoxide.

2. A herbicidal composition comprising dibenzothiophene-5-monoxide, an organic solvent therefor, water, and emulsifying agent.

3. The method of destroying undesirable plants which comprises applying to said plants a toxic quantity of a herbicidal composition comprising dibenzothiophene-5-monoxide as the essential active ingredient.

4. The method of destroying undesirable plants which comprises applying to said plants an oil-in-water emulsion of dibenzothiophene-5-monoxide.

ARTHUR H. SCHLESINGER.

No references cited.